(12) United States Patent
Teal et al.

(10) Patent No.: US 11,148,817 B2
(45) Date of Patent: Oct. 19, 2021

(54) ARM RESTRAINT CANOPY PIERCER

(71) Applicant: GOODRICH CORPORATION, Charlotte, NC (US)

(72) Inventors: Cyle Teal, Colorado Springs, CO (US); Neil Cross, Peyton, CO (US)

(73) Assignee: Goodrich Corporation, Charlotte, NC (US)

( * ) Notice: Subject to any disclaimer, the term of this patent is extended or adjusted under 35 U.S.C. 154(b) by 228 days.

(21) Appl. No.: 16/422,473

(22) Filed: May 24, 2019

(65) Prior Publication Data
US 2020/0298985 A1    Sep. 24, 2020

Related U.S. Application Data

(60) Provisional application No. 62/822,409, filed on Mar. 22, 2019.

(51) Int. Cl.
| | | |
|---|---|---|
| B64D 25/08 | (2006.01) | |
| B64D 25/04 | (2006.01) | |
| B64D 25/10 | (2006.01) | |
| B64C 1/32 | (2006.01) | |

(52) U.S. Cl.
CPC ............ B64D 25/04 (2013.01); B64D 25/10 (2013.01); *B64C 1/32* (2013.01)

(58) Field of Classification Search
CPC ........ B64D 25/02; B64D 25/04; B64D 25/06; B64D 25/08; B64D 25/10
See application file for complete search history.

(56) References Cited

U.S. PATENT DOCUMENTS

| | | | |
|---|---|---|---|
| 2,820,602 A | 1/1958 | Foster | |
| 3,721,407 A * | 3/1973 | Clarke | B64C 1/32 244/121 |
| 3,880,387 A | 4/1975 | Martin, Jr. | |
| 4,215,835 A * | 8/1980 | Wedgwood | B64D 25/02 244/122 AG |
| 4,436,262 A * | 3/1984 | Cummings | B64D 25/10 244/122 AG |
| 4,462,563 A | 7/1984 | Specker et al. | |
| 5,301,903 A * | 4/1994 | Aronne | B64D 25/02 244/122 AG |
| 5,301,904 A | 4/1994 | Guill | |
| 6,315,245 B1 * | 11/2001 | Ruff | B64D 25/02 244/122 AG |
| 8,485,471 B2 * | 7/2013 | Patterson | B64D 25/10 244/122 AG |
| 2017/0349292 A1 * | 12/2017 | Adams | B64D 25/10 |

* cited by examiner

*Primary Examiner* — Richard G Davis
(74) *Attorney, Agent, or Firm* — Snell & Wilmer L.L.P.

(57) ABSTRACT

An arm restraint assembly configured to pierce a canopy in response to expulsion of an ejection seat from a cockpit may comprise a primary arm configured to pivot relative to the ejection seat. A canopy piercer may be coupled to the primary arm. The primary arm may be configured to rotate to a fully-deployed position while located within the cockpit. An apex of the canopy piercer may be oriented toward the canopy, when the primary arm is in the fully-deployed position.

20 Claims, 5 Drawing Sheets

ARM RESTRAINT CANOPY PIERCER

CROSS REFERENCE TO RELATED APPLICATIONS

This application claims priority to, and the benefit of, U.S. Provisional Application Ser. No. 62/822,409, titled "ARM RESTRAINT CANOPY PIERCER," filed Mar. 22, 2019, which is incorporated herein in its entirety for all purposes by reference.

FIELD

The present disclosure relates to ejection seats, and more specifically, to ejection seat arm restraint assemblies having canopy piercers.

BACKGROUND

Ejection systems are designed to expel pilots from an aircraft cockpit. Upon ejection from the cockpit, the pilot enters the wind stream at the surface of the aircraft canopy. The pressure imposed on the pilot upon entering the wind stream (i.e., during windblast) acts to move the pilot's arms rearward. Current ejection seats may include limb restraint systems configured to reduce or prevent limb flail injuries during the ejection sequence. Some arm restraint systems may be configured to deploy inside the aircraft cockpit (i.e., prior to the pilot entering the windblast). However, the hole and/or fracture pattern created by canopy fracturing systems may not be large enough to allow a deployed arm restraint system to pass through the canopy without contacting full-strength, or unfractured, portions of canopy material. Contact with unfractured canopy material may damage the arm restraint system or otherwise cause the arm restraint system to not be in the proper position when the pilot enters the wind stream.

SUMMARY

An arm restraint assembly for an ejection seat is disclosed herein. In accordance with various embodiments, the arm restraint assembly may comprise a primary arm configured to pivot between a non-deployed position and a fully-deployed position and a canopy piercer coupled to the primary arm. An apex of the canopy piercer may be oriented away from the primary arm.

In various embodiments, a netting may be coupled to the primary arm. In various embodiments, a secondary arm may be coupled to the netting. In various embodiments, a netting bracket may be coupled to the netting. The netting may be coupled to the primary arm and the netting bracket such that the netting is drawn taut in response to the primary arm rotating to the fully-deployed position.

In various embodiments, a latch may be rotatably coupled to the primary arm. In various embodiments, a cord may be coupled to the latch.

In various embodiments, a lock assembly may be coupled to the primary arm. The lock assembly may be configured to restrict rotation of the primary arm in response to the primary arm rotating a predetermined number of degrees. In various embodiments, a primary arm bracket may be coupled to the primary arm. The primary arm may rotate relative to the primary arm bracket. The lock assembly may comprise a tab coupled to the primary arm and biased toward the primary arm bracket. The primary arm bracket may define a groove configured to receive the tab in response to the primary arm rotating the predetermined number of degrees.

An ejection seat is also disclosed herein. In accordance with various embodiments, the ejection seat may comprise a seat back and an arm restraint assembly coupled to the seat back. The arm restraint assembly may comprise a primary arm configured to pivot relative to the seat back and a canopy piercer coupled to the primary arm. An apex of the canopy piercer may be oriented away from the primary arm.

In various embodiments, a netting may be coupled to the primary arm and the seat back. In various embodiments, a secondary arm may be pivotably coupled to the seat back. In a non-deployed position, the secondary arm may be located between the primary arm and the seat back.

In various embodiments, a latch may be rotatably coupled to the primary arm. The latch may include a hook portion. The secondary arm may define a latch orifice configured to receive the hook portion of the latch. In various embodiments, the latch may further comprise a leg configured to limit a rotation of the latch relative to the primary arm. In various embodiments, a cord may be coupled to an end of the latch opposite the leg of the latch.

In various embodiments, a lock assembly may be coupled to the primary arm. The lock assembly may be configured to restrict rotation of the primary arm in response to the primary arm rotating a predetermined number of degrees. In various embodiments, a primary arm bracket may be coupled to the primary arm. The primary arm may rotate relative to the primary arm bracket. The lock assembly may comprise a tab coupled to the primary arm and biased toward the primary arm bracket. The primary arm bracket may define a groove configured to receive the tab in response to the primary arm rotating the predetermined number of degrees.

An arm restraint assembly configured to pierce a canopy in response to expulsion of an ejection seat from a cockpit is also disclosed herein. In accordance with various embodiments, the arm restraint assembly may comprise a left arm restraint and a right arm restraint. The left arm restraint and the right arm restraint may each comprise a primary arm configured to pivot to a fully-deployed position within the cockpit and a canopy piercer coupled to the primary arm. An apex of the canopy piercer may be oriented toward the canopy when the primary arm is in the fully-deployed position.

In various embodiments, a center axis of the canopy piercer may be oriented generally normal to a plane tangent to a point of contact between the apex of the canopy piercer and the canopy.

In various embodiments, the left arm restraint and the right arm restraint may each further comprise a cord coupled to a static structure in the cockpit and configured to rotate the primary arm in response to translation of the ejection seat toward the canopy.

In various embodiments, the left arm restraint and the right arm restraint may each further comprise a lock assembly coupled to the primary arm. The lock assembly may be configured to restrict rotation of the primary arm in response to the primary arm rotating a predetermined number of degrees.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
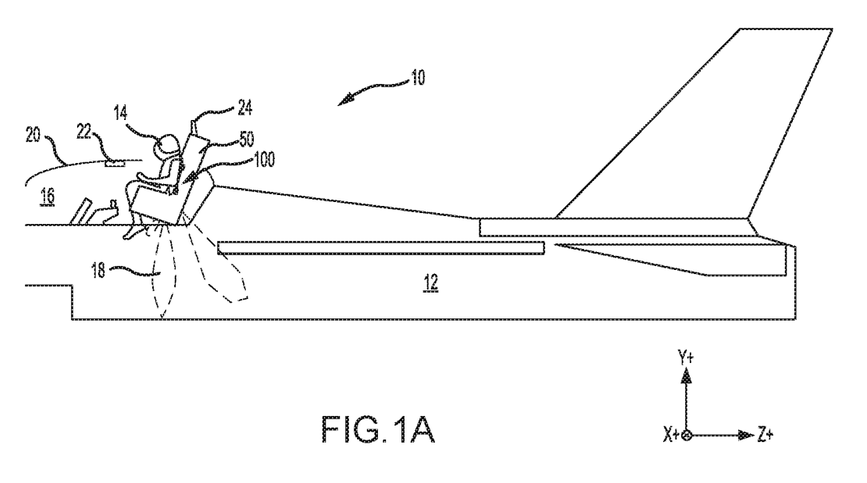
FIG. 1A illustrates an ejection seat being launched from an aircraft cockpit, in accordance with various embodiments.

With reference to FIG. 1A, an aircraft ejection system 10 is shown, in accordance with various embodiments. Aircraft ejection system 10 may be installed in aircraft 12 to expel an ejection seat 50 and an occupant 14 of ejection seat 50 from a cockpit 16 of aircraft 12. Ejection seat 50 may be urged from cockpit 16 by a propulsion system 18. A canopy 20 may be located over cockpit 16. Ejection system 10 may be configured to remove portions of canopy 20 from over occupant 14. For example, ejection system 10 may include a fracture system 22 and/or a canopy piercer 24 mounted to ejection seat 50 to fracture canopy 20.

In accordance with various embodiments, ejection seat 50 includes an arm restraint assembly 100. Arm restraint assembly 100 may be configured to deploy while at least the portion of ejection seat 50 proximate the arms of occupant 14 is located within cockpit 16. Stated differently, ejection system 10 may cause arm restraint assembly 100 to deploy prior to the arms of occupant 14 entering the wind stream outside of cockpit 16 and canopy 20. Arm restraint assembly 100 is configured to limit rearward movement of the arms of occupant 14 (i.e., movement toward the tail end of aircraft 12 or in the positive Z-direction on the provided XYZ axes).

During expulsion of ejection seat 50, a portion of canopy 20 may remain over arm restraint assembly 100. As described herein, arm restraint assembly 100 may include a canopy piercer configured to contact and fracture any portions of canopy 20 that may remain over arm restraint assembly 100. Fracturing the canopy portions located over arm restraint assembly 100 may allow arm restraint assembly 100 to better withstand the bending loads created by canopy 20 contacting arm restraint assembly 100. The canopy piercer may be coupled to arm restraint assembly 100 such that the canopy piercer contacts canopy 20 prior to other components of arm restraint assembly 100. The canopy piercer is configured to generate a high pressure in the material of canopy 20 upon contact, thereby causing a dynamic fracture that weakens the canopy material. The weakened canopy material tends to provide less resistance and reduces the loads experienced by the components of arm restraint assembly 100, thereby decreasing a likelihood that arm restraint assembly 100 will be damaged by contact with the canopy and increasing a probability that arm restraint assembly 100 will be available to support and restrain the arms of occupant 14.

Figure 1B:
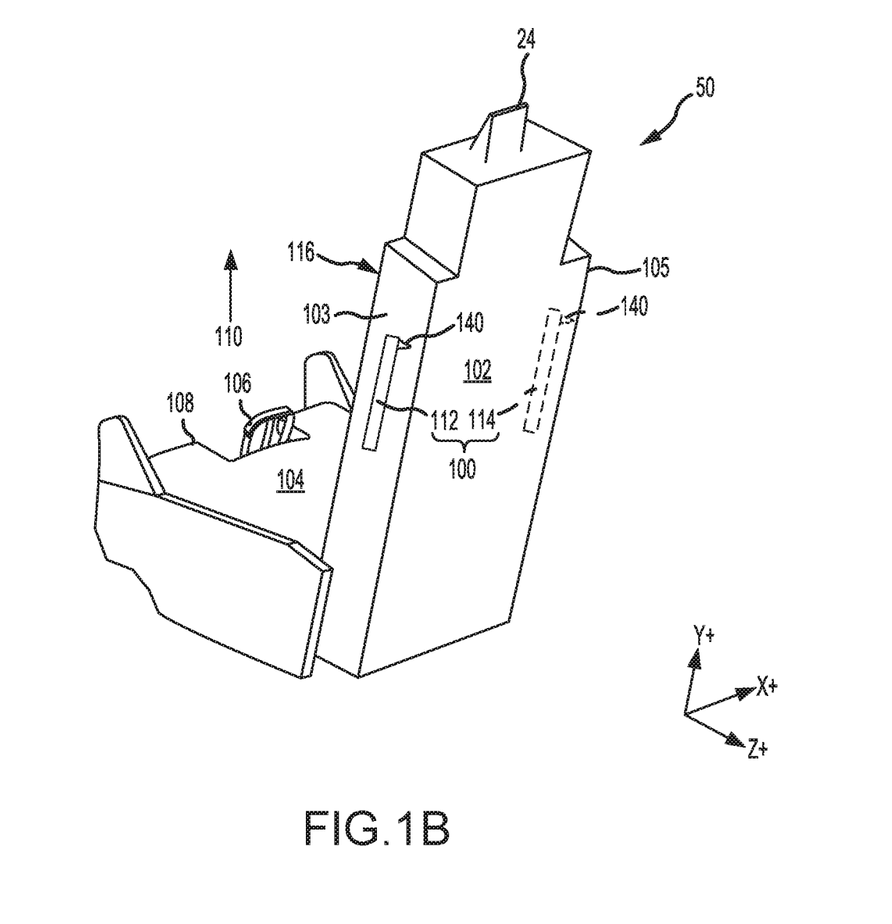
FIG. 1B illustrates a perspective view of an ejection seat, in accordance with various embodiments.

With reference to FIG. 1B, ejection seat 50 is illustrated with arm restraint assembly 100 in a non-deployed position, in accordance with various embodiments. Ejection seat 50 includes a seat back 102 and a seat pan 104. In various embodiments, an ejection handle 106 may be located proximate a front side 108 of seat pan 104. Frontside 108 of seat pan 104 is generally opposite, or distal, seat back 102. While FIG. 1B shows ejection handle 106 located at frontside 108 of seat pan 104, it is further contemplated and understood that ejection handle 106 may be located anywhere that is accessible to an occupant of ejection seat 50. Ejection handle 106 may be configured to initiate an ejection sequence upon actuation. For example, occupant 14 (with momentary reference to FIG. 1A) pulling ejection handle 106 in the direction of arrow 110 by may cause ejection seat 50 to be expelled from cockpit 16.

Ejection seat 50 includes arm restraint assembly 100. Arm restraint assembly 100 may include a left (or first) arm restraint 112 and a right (or second) arm restraint 114. Left arm restraint 112 and right arm restraint 114 each include a canopy piercer 140. In the non-deployed position, canopy piercers 140 are oriented generally away from a frontside 116 of seat back 102. As used herein "a frontside" of a seat back 102 refers to the side of the seat back 102 that is oriented toward an occupant of ejection seat 50. Left and right arm restraints 112, 114 may be located at opposing sides of seat back 102. Left arm restraint 112 may be located proximate a left side panel 103 of seat back 102. Right arm restraint 114 may be located proximate a right side panel 105 of seat back 102. As described in further detail below, left and right arm restraints 112, 114 may include arms, or struts, configured to pivot relative to seat back 102. Upon initiation of the ejection sequence, the arms of left and right arm restraints 112, 114 pivot, or otherwise rotate, to a fully-deployed position. In the fully-deployed position, canopy piercers 140 are oriented toward canopy 20, with momentary reference to FIG. 1A.

Figure 2A:
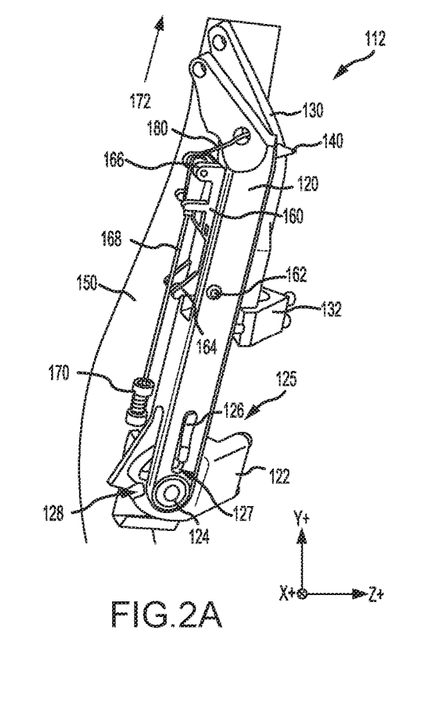
FIGS. 2A and 2B illustrate perspective views of an arm restraint assembly in a non-deployed state, in accordance with various embodiments.
Figure 2B:
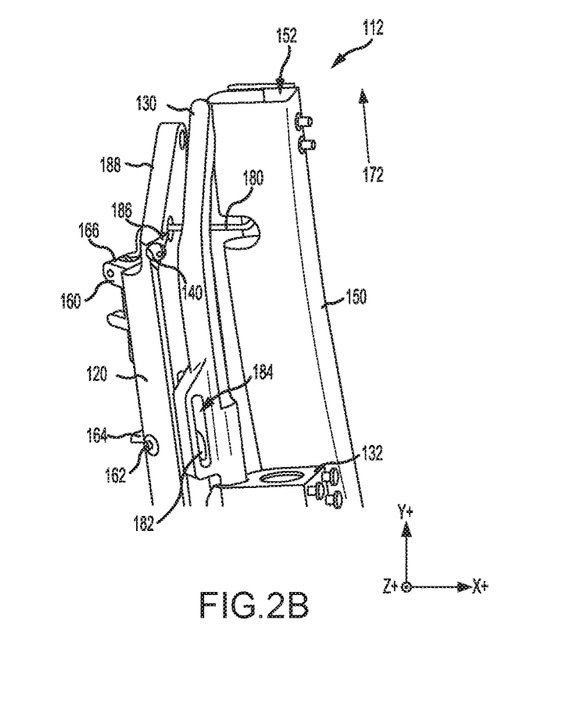

With reference to FIGS. 2A and 2B, and continuing reference to FIG. 1B, left arm restraint 112 is illustrated in a non-deployed position, in accordance with various embodiments. While elements and functionalities of left arm restraint 112 are described in relation to FIGS. 2A and 2B and to FIG. 4, it is further contemplated and understood that right arm restraint 114 is a mirror image of left arm restraint 112 and includes the elements and functionalities as described herein with respect to left arm restraint 112.

Left arm restraint 112 includes a primary (or first) arm 120. In various embodiments, left arm restraint 112 may include a secondary (or second) arm 130. In the non-deployed position, secondary arm 130 may be located between primary arm 120 and a fixed net cover 150. Fixed net cover 150 may form a portion of seat back 102 (FIG. 1B) and/or may be otherwise be attached to seat back 102. In response to deployment of ejection seat 50, primary arm 120 and secondary arm 130 pivot relative to left side panel 103 of seat back 102. Primary arm 120 is coupled or otherwise attached to seat back 102 (e.g., to left side panel 103) via a primary arm bracket 122. Primary arm bracket 122 is attached to seat back 102 via pins, rivets, screws, clips, or any other securement device. Secondary arm 130 is coupled or otherwise attached to seat back 102 (e.g., to left side panel 103) via a secondary arm bracket 132. Secondary arm bracket 132 is attached to seat back 102 via pins, rivets, screws, clips, or any other securement device. In various embodiments, primary arm bracket 122 and secondary arm bracket 132 are static structures, which do not pivot or otherwise rotate relative to seat back 102.

Primary arm 120 may be rotationally coupled to primary arm bracket 122 via a primary arm pivot joint 124. Primary arm 120 may rotate, relative to primary arm bracket 122, about primary arm pivot joint 124 to deploy left arm restraint 112. Secondary arm 130 may be rotationally coupled to secondary arm bracket 132 via a secondary arm pivot joint. Secondary arm 130 may rotate, relative to secondary arm bracket 132, about the secondary arm pivot joint during the deployment of left arm restraint 112.

In various embodiments, primary arm 120 may include a lock assembly 125. Lock assembly 125 may be configured to lock primary arm 120 in the fully-deployed position. For example, lock assembly 125 may be configured such that in response to the primary arm 120 rotating a predetermined number of degrees (e.g., 90°), lock assembly 125 will prevent, or otherwise block, further rotation of primary arm 120 and will prevent, or otherwise block, primary arm 120 from rotating in the opposite direction (i.e., toward secondary arm 130 and left side panel 103 of seat back 102). In various embodiments, lock assembly 125 may include a tab 126 coupled to primary arm 120. In various embodiments, tab 126 may be located in an orifice 127 defined by primary arm 120. Tab 126 is biased in a radially inward direction. Stated differently, tab 126 is biased toward primary arm pivot joint 124. Primary arm bracket 122 may define a groove 128. Groove 128 is configured to receive tab 126. Locating tab 126 in groove 128 generates an interference between tab 126 and primary arm bracket 122 that restricts or otherwise prevents rotation of primary arm 120 about primary arm pivot joint 124. In various embodiments, a location of groove 128 in primary arm bracket 122 may be selected such that tab 126 will translate into groove 128 when primary arm 120 has rotated a predetermined number of degrees (e.g., 75°, 90°, 100°, etc.).

Left arm restraint 112 includes a latch 160. Latch 160 is rotationally coupled to primary arm 120 via a latch pivot joint 162. Latch 160 may rotate, relative to primary arm 120, via latch pivot joint 162. Latch 160 may include one or more leg(s) 164. In the non-deployed position, legs 164 may extend away from primary arm 120, in a direction generally opposite, or away from, canopy piercer 140. As primary arm 120 rotates about latch pivot joint 162, a head end 166 of latch 160 may rotate away from primary arm 120 while legs 164 rotate toward primary arm 120. Head end 166 of latch 160 may be located opposite, or distal, latch pivot joint 162 and legs 164. A cord, or cable, 168 may be attached at one end (e.g., a first end) to head end 166 of latch 160 and at an opposite end (e.g., a second end) to an anchor 170.

With combined reference to FIG. 1A and FIG. 2A, anchor 170 is coupled or otherwise attached to a stationary structure (e.g., a seat rail, a wall, floor, etc.) within cockpit 16. In this regard, expulsion of ejection seat 50 from cockpit 16, ejection seat 50 translates toward canopy 20 (i.e., in the direction of arrow 172 in FIG. 2A), while anchor 170 remains stationary. As ejection seat 50 travels toward canopy 20, the coupling between latch 160 and anchor 170 causes latch 160 to rotate about latch pivot joint 162. Latch 160 rotates about latch pivot joint 162 until legs 164 contact primary arm 120. Legs 164 contacting primary arm 120 creates an interference that prevents further rotation of latch 160.

Figure 3:
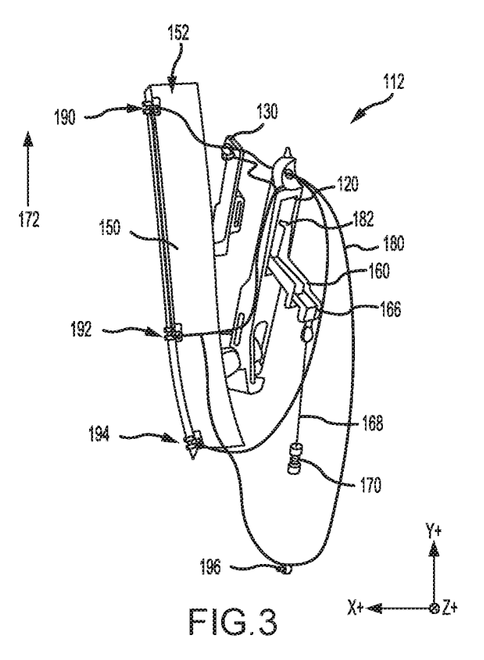
FIG. 3 illustrates perspective view of an arm restraint assembly in a partially deployed state, in accordance with various embodiments.

With reference to FIG. 3, left arm restraint 112 is illustrated in a partially deployed position. With combined reference to FIG. 2A and FIG. 3, as ejection seat 50 continues to translate in the direction of arrow 172, the interference between latch 160 and primary arm 120 causes the load from cord 168 to transfer to primary arm 120, thereby causing primary arm 120 to rotate about primary arm pivot joint 124. Primary arm 120 rotates about primary arm pivot joint 124 until tab 126 translates into groove 128.

Left arm restraint 112 further includes a netting 180 is coupled to primary arm 120. Netting 180 may comprise rope, ribbon, webbing, string, etc. Netting 180 may be formed from polyaramid paraphenylene terephthalamide (PPTA), nylon, ballistic nylon, polypropylene, polyester, cotton, metal, metal alloy, or other suitable material. In the non-deployed position, netting 180 is located proximate fixed net cover 150 (i.e., proximate left side panel 103 of seat back 102, with momentary reference to FIG. 1B). In various embodiments, fixed net cover 150 may define a channel 152. Channel 152 may house portions of netting 180 prior to deployment of left arm restraint 112.

Netting 180 may be coupled or otherwise attached to ejection seat 50 via a plurality of netting brackets, for example, via netting brackets 190, 192, 194, 196. In various embodiments, netting brackets 190, 192, 194 may be attached to seat back 102, with momentary reference to FIG. 1B, and netting bracket 196 may be attached to seat pan 104. Netting brackets 190, 192, 194, 196 may be attached to ejection seat 50 via pins, rivets, screws, clips, or any other securement device. Netting 180 is also attached to primary arm 120. As primary arm 120 rotates about primary arm pivot joint 124, netting 180 is drawn out of channel 152 and away from fixed net cover 150.

In various embodiments, latch 60 may include a hook portion 182. Hook portion 182 may be located approximately 90° from head end 166 of latch 160 and approximately 180° from legs 164, with momentary reference to FIG. 2A. Secondary arm 130 may define a latch orifice 184 configured to receive hook portion 182. For example and with momentary reference to FIG. 2B, in the non-deployed position, hook portion 182 may be located in latch orifice 184. In various embodiments, hook portion 182 may be configured to engage second arm within latch orifice 184. For example, locating hook portion 182 in latch orifice 184 may secure primary arm 120 to secondary arm 130. As latch 160 rotates about latch pivot joint 162, hook portion 182 rotates out of latch orifice 184, thereby allowing primary arm 120 to separate from (i.e., rotate away from) secondary arm 130. In various embodiments, a portion of netting 180 may be coupled to secondary arm 130. As primary arm 120 rotates to the fully-deployed position, netting 180 may force secondary arm 130 to rotate away from fixed net cover 150.

Figure 5:
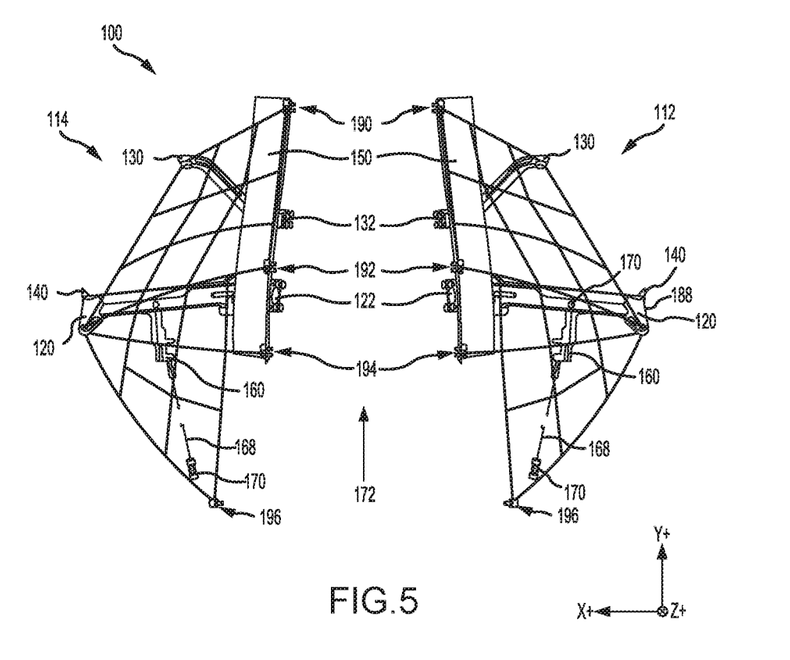
FIG. 5 illustrates a perspective view of an arm restraint assembly in a fully-deployed state, in accordance with various embodiments.

FIG. 5 shows arm restraint assembly 100 with left and right arm restraints 112, 114 in the fully-deployed position, in accordance with various embodiments. Seat back 102 and seat pan 104 have been removed from FIG. 5 for clarity and to illustrate the features of arm restraint assembly 100. In the fully-deployed position, netting 180 is drawn taut between primary arm 120 and netting brackets 190, 192, 194, 196. Netting 180 may restrict rearward arm movement for occupant 14, with momentary reference to FIG. 1A. Cord 168 may sever after primary arms 120 lock in the full-deployed position. For example, a tensile strength of cord 168 may be less than the tensile strength of latch 160 and/or less than the force of the interference created by tab 126 being located in groove 128, with momentary reference to FIG. 2A. In this regard, cord 168 may be configured to sever after primary arm 120 locks and as ejection seat 50 continues to translate away from anchor 170 (i.e., in the direction of arrow 172).

With combined reference to FIG. 1A and FIG. 5, arm restraint assembly 100 is configured (e.g., a length of cord 168, a location of anchor 170, etc. are selected) such that primary arms 120 will be in the fully-deployed and locked position prior to canopy piercers 140 contacting canopy 20. Canopy piercers 140 are attached to primary arms 120 such that when primary arms 120 are in the fully-deployed and locked position, an apex 146 of canopy piercer 140, with momentary reference to FIG. 4, will be oriented toward canopy 20.

Figure 4:
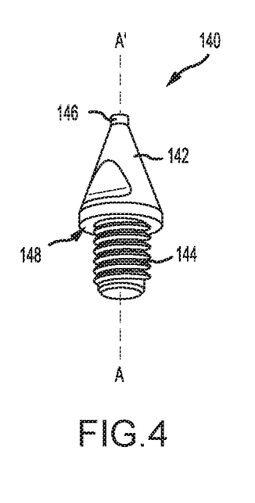
FIG. 4 illustrates a perspective view of a canopy piercer for an arm restraint assembly, in accordance with various embodiments.

With reference to FIG. 4, a canopy piercer 140 is illustrated, in accordance with various embodiments. Canopy piercer 140 includes a head 142 and a shaft 144. In various embodiments, head 142 may include a generally conical, frustoconical, or pyramidal shape. Apex 146 is located at an end of head 142 opposite shaft 144. In various embodiments, apex 146 may have a cylindrical shape. Apex 146 may also be conical, frustoconical, or pyramidal.

With combined reference to FIG. 2B and FIG. 4, primary arm 120 is configured to receive shaft 144. In various embodiments, shaft 144 may be threaded. In this regard, primary arm 120 may define a threaded orifice configured to engage threaded shaft 144 and secure canopy piercer 140 to primary arm 120. Shaft 144 may also be press fit into primary arm 120. A location of canopy piercer 140 is selected such that canopy piercer 140 will contact canopy 20 prior to primary arm 120 contacting canopy 20. In various embodiments, canopy piercer 140 may be located at proximate a distal end 188 of primary arm 120. Distal end 188 may be located opposite or distal seat back 102, when primary arm is in the fully deployed position.

Primary arm 120 is configured such that when canopy piercer 140 is coupled to primary arm 120, a surface 148 of head 142 will be parallel to and rest flush on a surface 186 of primary arm 120. Apex 146 is oriented away from primary arm 120. Canopy piercer 140 is coupled to primary arm 120 such that a center axis A-A' of canopy piercer 140 is oriented generally normal to a plane tangent to the point of contact between apex 146 and canopy 20. Stated differently, surface 186 is oriented such that center axis A-A' is oriented generally normal to a plane that is tangent to canopy 20 at the location where apex 146 contacts canopy 20 during expulsion of ejection seat 50 from cockpit 16. As used herein, "approximately normal" means between 80° and 100°. Center axis A-A' is located through a center point of apex 146 (i.e., through the point from which a radius of apex 146 is measured).

With combined reference to FIG. 1A and FIG. 5, during expulsion of ejection seat from cockpit 16, canopy piercers 140 may contact and fracture any portions of canopy 20 remaining over arm restraint assembly 100. Canopy piercers 140 may contact canopy 20 prior to other components of arm restraint assembly 100 (e.g., prior to primary arm 120). Canopy piercers 140 (e.g., apex 146) fracture and/or weaken the material of canopy 20, which tends to reduce the loads experienced by primary arms 120. Arm restraint assembly 100 having canopy piercers 140 may be less likely to be damaged from contact with the canopy 20, thereby increasing a probability that arm restraint assembly 100 will be available to support and restrain the arms of occupant 14.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An arm restraint assembly for an ejection seat, comprising:
   a primary arm configured to pivot between a non-deployed position and a fully-deployed position; and
   a canopy piercer coupled to the primary arm such that the canopy piercer pivots with the primary arm, wherein an apex of the canopy piercer is oriented away from the primary arm.

2. The arm restraint assembly of claim 1, further comprising a netting coupled to the primary arm.

3. The arm restraint assembly of claim 2, further comprising a secondary arm coupled to the netting.

4. The arm restraint assembly of claim 3, further comprising a netting bracket coupled to the netting, wherein the netting is coupled to the primary arm and the netting bracket such that the netting is drawn taut in response to the primary arm rotating to the fully-deployed position.

5. The arm restraint assembly of claim 1, further comprising a latch rotatably coupled to the primary arm.

6. The arm restraint assembly of claim 5, further comprising a cord coupled to the latch.

7. The arm restraint assembly of claim 1, further comprising a lock assembly coupled to the primary arm, wherein the lock assembly is configured to restrict rotation of the primary arm in response to the primary arm rotating a predetermined number of degrees.

8. The arm restraint assembly of claim 7, further comprising a primary arm bracket coupled to the primary arm, wherein the primary arm rotates relative to the primary arm bracket, and wherein the lock assembly comprises a tab coupled to the primary arm and biased toward the primary arm bracket, wherein the primary arm bracket defines a groove configured to receive the tab in response to the primary arm rotating the predetermined number of degrees.

9. An ejection seat, comprising:
   a seat back; and
   an arm restraint assembly coupled to the seat back, the arm restraint assembly comprising:
     a primary arm configured to pivot relative to the seat back; and
     a canopy piercer coupled to the primary arm such that the canopy piercer pivots with the primary arm, wherein an apex of the canopy piercer is oriented away from the primary arm.

10. The ejection seat of claim 9, further comprising a netting coupled to the primary arm and the seat back.

11. The ejection seat of claim 10, further comprising a secondary arm pivotably coupled to the seat back, wherein in a non-deployed position the secondary arm is located between the primary arm and the seat back.

12. The ejection seat of claim 11, further comprising a latch rotatably coupled to the primary arm, wherein the latch includes a hook portion, and wherein the secondary arm defines a latch orifice configured to receive the hook portion of the latch.

13. The ejection seat of claim 12, wherein the latch further comprises a leg configured to limit a rotation of the latch relative to the primary arm.

14. The ejection seat of claim 13, further comprising a cord coupled to an end of the latch opposite the leg of the latch.

15. The ejection seat of claim 9, further comprising a lock assembly coupled to the primary arm, wherein the lock assembly is configured to restrict rotation of the primary arm in response to the primary arm rotating a predetermined number of degrees.

16. The ejection seat of claim 15, further comprising a primary arm bracket coupled to the primary arm, wherein the primary arm rotates relative to the primary arm bracket, and wherein the lock assembly comprises a tab coupled to the primary arm and biased toward the primary arm bracket, wherein the primary arm bracket defines a groove configured to receive the tab in response to the primary arm rotating the predetermined number of degrees.

17. An arm restraint assembly configured to pierce a canopy in response to expulsion of an ejection seat from a cockpit, the arm restraint assembly comprising:
   a left arm restraint and a right arm restraint, wherein the left arm restraint and the right arm restraint each comprise:
     a primary arm configured to pivot to a fully-deployed position within the cockpit; and
     a canopy piercer coupled to the primary arm and configured to pivot with the primary arm, wherein an apex of the canopy piercer is oriented toward the canopy when the primary arm is in the fully-deployed position.

18. The arm restraint assembly of claim 17, a center axis of the canopy piercer is oriented generally normal to a plane tangent to a point of contact between the apex of the canopy piercer and the canopy.

19. The arm restraint assembly of claim 17, wherein the left arm restraint and the right arm restraint each further comprise a cord coupled to a static structure in the cockpit and configured to rotate the primary arm in response to translation of the ejection seat toward the canopy.

20. The arm restraint assembly of claim 19, wherein the left arm restraint and the right arm restraint each further comprise a lock assembly coupled to the primary arm, wherein the lock assembly is configured to restrict rotation of the primary arm in response to the primary arm rotating a predetermined number of degrees.

* * * * *